United States Patent
Adamczyk

(12) 
(10) Patent No.: US 6,302,118 B1
(45) Date of Patent: Oct. 16, 2001

(54) FINGERNAIL STIMULATOR AND METHOD FOR USE THEREOF

(76) Inventor: Lucille Adamczyk, 4132 S. Rainbow Blvd., #175, Las Vegas, NV (US) 89103

( * ) Notice: Subject to any disclaimer, the term of this patent is extended or adjusted under 35 U.S.C. 154(b) by 0 days.

(21) Appl. No.: 09/666,746

(22) Filed: Sep. 20, 2000

Related U.S. Application Data

(63) Continuation-in-part of application No. 09/036,502, filed on Mar. 6, 1998, now abandoned.
(60) Provisional application No. 60/047,073, filed on May 19, 1997.

(51) Int. Cl.[7] ................................................. A45D 29/18
(52) U.S. Cl. ......................................................... 132/76.4
(58) Field of Search .................................. 132/76.4, 76.5, 132/73, 73.5, 73.6; 601/28, 40, 137, 51

(56) References Cited

U.S. PATENT DOCUMENTS

| | | | | |
|---|---|---|---|---|
| 1,152,330 | * | 8/1915 | Macomber | 132/76.5 |
| 1,553,756 | * | 9/1925 | Dienner | 132/73 |
| 3,387,313 | * | 6/1968 | Smith et al. | 132/73 |
| 3,993,027 | * | 11/1976 | Mullin | 119/706 |
| 4,003,372 | * | 1/1977 | Willoby | 601/28 |
| 4,184,499 | * | 1/1980 | Seidler | 132/75.6 |
| 4,187,837 | * | 2/1980 | Braun | 601/46 |
| 4,329,981 | * | 5/1982 | Dungl | 601/28 |
| 4,996,946 | * | 3/1991 | Olson | 119/29 |
| 5,038,716 | * | 8/1991 | Olson | 119/29 |
| 5,716,331 | * | 2/1998 | Chang | 601/50 |
| 5,755,676 | * | 5/1998 | Chen | 601/82 |
| 5,910,123 | * | 6/1999 | Wang | 601/50 |

* cited by examiner

*Primary Examiner*—Eduardo C. Robert
(74) *Attorney, Agent, or Firm*—Philip J. Anderson; Anderson & Morishita

(57) ABSTRACT

A fingernail stimulator for stimulating the fingernails and fingertips includes at least one plate having at least one portion with a rough substantially non-abrasive surface thereon. In a first embodiment, the device further includes a triangular-shaped stand for holding the at least one plate in an upright position. In a second embodiment, the plate is place substantially flat and the fingernails moved against the rough substantially non-abrasive surface in a brisk back and forth motion. In a third embodiment, the substantially flat plate is oscillated by a coupled plate driver while the fingernails remain substantially motionless on the rough, substantially non-abrasive surface. The oscillating motion of the substantially flat plate provides the necessary beneficial friction against the fingernails. A method for using the fingernail stimulator is also provided.

3 Claims, 2 Drawing Sheets

FINGERNAIL STIMULATOR AND METHOD FOR USE THEREOF

RELATED APPLICATION DATA

This application is a continuation-in-part application of application Ser. No. 09/036,502 filed Mar. 6, 1998 abandoned and titled "Fingernail Stimulator and Method for Use Thereof" which was a non-provisional application of provisional application Ser. No. 60/047,073 filed May 19, 1997 which is incorporated herein by reference thereto and the May 19, 1997 date of the filing thereof is claimed as the priority date for this patent application.

FIELD OF THE INVENTION

This invention relates generally to reflexology tools and method therefor and, more particularly, to a fingernail and fingertip stimulator and a method for use thereof.

BACKGROUND OF THE INVENTION

The field of reflexology has recognized that stimulation of the fingers and fingertips can provide a feeling of relaxation and stimulation. In a publication, "Body Reflexology" by Mildred Carter published in 1993 buffing of fingernails together for the above benefit was described when the author stated "Place the fingernails of one hand against the fingernails of the other hand and buff them together. Buff faster and faster, until you are making them sing. After doing this for a few minutes, stop and hold the hands relaxed. Feel the build-up of electrical energy in the hands. When you relax, you feel this powerful force stimulating your whole body."

While the mechanism is not clear, I have found that buffing the nails and the resulting, repetitive impacts between the fingernails does provide stimulation and relaxation to the fingernails and fingertips. This stimulation, I have also found, can provide overall relaxation.

Stimulation of the fingernails is also the subject of U.S. Pat. No. 4,187,837 issued Feb. 12, 1980 to Baum.

The study of reflexology recognizes that nerves from all parts of the body have endings in the hands and feet. By applying pressure to the hands and/or feet, a reaction in the corresponding area of the body can be felt. The effects of this pressure are easing, healing or energizing of the nervous system.

A drawback to fingernail against fingernail buffing is that the fingernails do provide a consistent surface for buffing. Further, stimulating action provided by the repeated fingernail-to-fingernail contact is not efficiently imparted since the number of contacts (impacts) during any buffing cycle is limited by the number of fingernails of the other hand which are contacted.

Accordingly, there has been a need for a novel fingernail stimulator and method which is of simplified construction, easy to use and which provides an even greater benefit and contribution to one's well-being. Additionally, a fingernail stimulator and method is needed which provides an area over which the fingernails are buffed to provide a uniform stimulus. Further there is a need for a device which provides for a greater number of impacts during the buffing cycle to increase the stimulation. The present invention fulfills these needs and provides other related advantages.

SUMMARY OF THE INVENTION

In accordance with this invention, it is an object of this invention to provide a fingernail and fingertip stimulator and method that increases and provides for more efficient stimulation.

It is a further object to provide a fingernail stimulator and method that provides a surface area over which the fingernails are buffed to provide a substantially uniform and increased stimulus.

The present invention resides in a fingernail stimulator and method for use as a reflexology tool for relaxing and energizing the fingernails and fingertips. The fingernail stimulator comprises, generally, at least one plate and a rough substantially non-abrasive surface on at least one portion thereof against which the fingernails of one or both hands are rubbed. A method of using the fingernail stimulator is also described.

The at least one plate may be constructed of a moderately stiff material, for example acrylic plastic. The at least one portion includes at least one outer surface of the plate which may itself be roughened or have adhered to it the rough substantially non-abrasive surface adhered to it or otherwise attached in some manner such as by two sided adhesive tape, glue or the like. The at least one plate is preferably rectangular, however, any desired shape may be used.

In a first embodiment, the fingernail stimulator further includes a stand which holds the at least one plate in an upright position. The stand holds the substantially-rectangular plate or plates along one sides of the at least one plate. The stand is a base portion that is preferably substantially triangular-shaped to provide stability when placed on a table or other substantially flat surface. Both outer surfaces of the at least one plate have the rough substantially non-abrasive surface making it possible to stimulate the fingernails of both hands at the same time.

In a second embodiment, the plate is placed in a substantially flat position with the rough substantially non-abrasive surface on an upper surface thereof The fingernails of both hands are placed on the upper surface of the plate.

In a third embodiment, the fingernail stimulator further includes a plate driver coupled to the plate. The plate driver oscillates the plate back and forth providing the necessary beneficial friction against the substantially motionless fingernails which are preferably held stationary in one fixed position.

In the method of the invention using the fingernail stimulator of the first embodiment, the user places a bottom portion of the stand on any flat surface that is comfortable or places it on his or her lap. The user briskly and lightly rubs in preferably an up and down fashion the flat surface of the fingernails of the left hand on one of the outer surfaces and the fingernails of the right hand on the other of the outer surface. With the fingernail stimulator of the second embodiment, the user should briskly and lightly rub the flat part of the fingernails of both hands over the same rough substantially nonabrasive surface. In the method of the invention using the fingernail stimulator of the third embodiment, the user need only place the flat surface of the fingernails on the same rough substantially nonabrasive surface. The oscillating movement of the plate provides the necessary movement against the fingernails. The fingernails should be preferably stimulated in this manner about five minutes, three times a day.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DESCRIPTION

Figure 2:
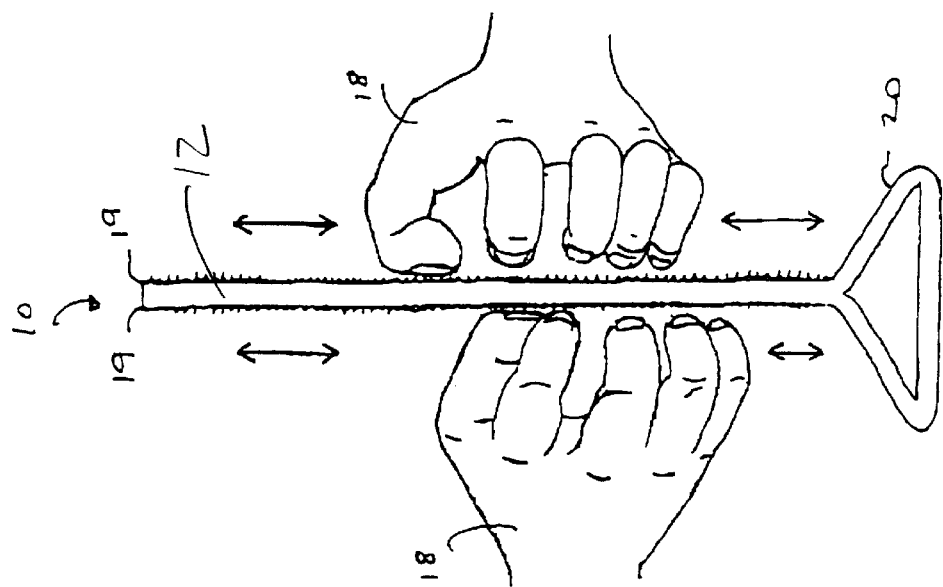
FIG. 2 is an end view of the device of FIG. 1.

Reference is now made to the figures wherein like parts are referred to by like numerals throughout. As shown in the drawings for purposes of illustration, the present invention is concerned with a fingernail stimulator, generally designated in the accompanying drawings by the reference number 10. The fingernail stimulator 10 includes, generally, a plate 12 and a rough substantially non-abrasive surface 14 on at least one portion thereof against which the fingernails 16 of one or both hands 18 are rubbed for stimulation. A method for using the fingernail stimulator 10 is also described.

The at least one plate 12 is preferably constructed of a moderately stiff material, for example acrylic plastic. Of course, other materials may also be used such as stainless steel as long as it has high static electricity properties. The plate 12 may be molded or produced in some other fashion. The at least one plate 12 may be substantially rectangular.

The plastic itself may be roughened to produce the rough substantially non-abrasive surface 14 or a laminate of "cracked glass" or similar material with a rough substantially non-abrasive surface may be coupled to an outer surface 19 of the at least one plate 12. The rough substantially non-abrasive surface 14 should feel bumpy and uneven to the touch and preferably should present ridges, bumps in a close spacing to increase the frequency of impact with the fingernails during a buffing action. By close spacing what is meant is on the order of ≦one-half inches. Further the ridges should be disposed transverse to the direction of buffing as hereinafter described. The surface 14 should also not have the consistency of sandpaper so as to abrade the nails. It has been found that a rigid, hard plastic material is satisfactory.

Figure 1:
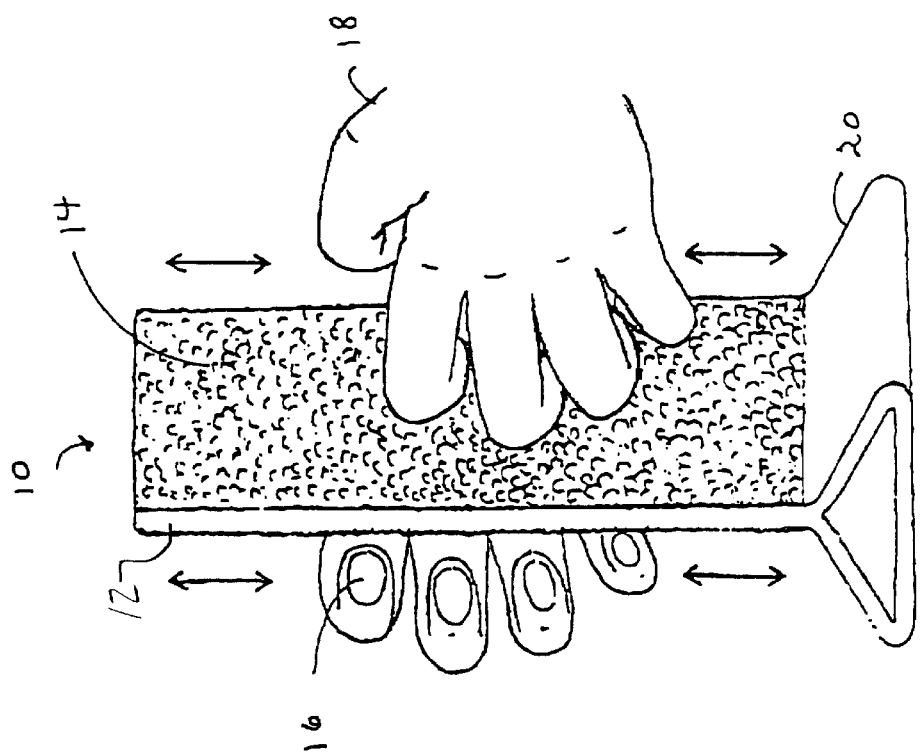
FIG. 1 is a front-end perspective view of a fingernail stimulation device according to one of the invention.

In the first preferred embodiment as shown in FIGS. 1 and 2, the fingernail stimulator 10 further includes a stand 20 which supports an integrally formed plate or a pair of side-by-side substantially rectangular plates 12 in an upstanding position. The stand 20 may be integral with the plates as shown in FIGS. 1 and 2. The stand 20 is preferably substantially triangular-shaped to provide stability when placed on a table or other substantially flat surface to support the plate 20 in the upstanding position as shown in FIGS. 1 and 2. It is preferred that the outer surfaces 19 of both plates 12 have the rough substantially non-abrasive surface 14 making it possible to stimulate the fingernails 16 of both hands 18 at the same time, as shown in FIGS. 1 and 2 in opposed buffing as shown. The opposed buffing enables the user to press the fingernails 16 against the surface 14 and the plate 12.

It is of course to be appreciated that only one surface 14 may be provided on one side of the plate 12 with the user holding the side of the plate 12 without the surface with one hand while buffing with the other.

Figure 3:
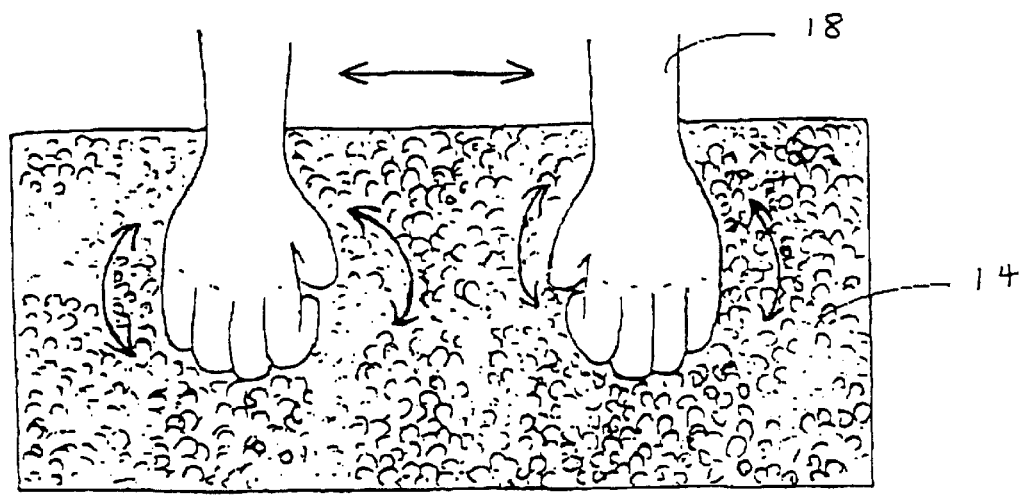
FIG. 3 is top view of the fingernail stimulation device according to another embodiment of the invention.

In a second embodiment as shown in FIG. 3, the plate 12 is placed in a substantially flat position with the rough substantially non-abrasive surface 14 on an upper surface thereof. The preferred size of the plate 12 is about five inches by about ten or twelve inches.

Figure 4:
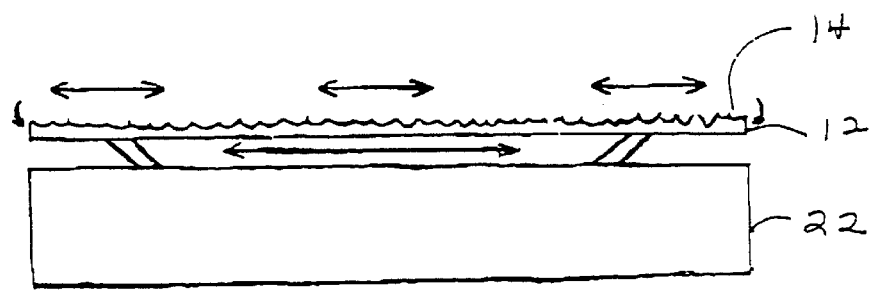
FIG. 4 is a side view of a fingernail stimulation device according to a third embodiment of the invention, illustrating the provision of a plate driver coupled to the plate which oscillates the plate of FIG. 3 to permit the hands and fingernails to be held substantially motionless.

In a third embodiment as illustrated in FIG. 4, the fingernail stimulator further includes a plate driver 22 coupled to the plate 12. The plate driver 22 oscillates the plate 12 back and forth. The plate driver 22 may use a motor (not shown) powered by electricity, battery or wind up device or other power means that is coupled to and which will oscillate the plate.

In the method of the invention using the fingernail stimulator 10 of the first embodiment, the user places a bottom portion of the stand 20 on any flat surface that is comfortable or places it on-his or her lap. The user places a hand on both outer surfaces 19 of the fingernail stimulator 10 and briskly and lightly rubs the flat surface of the fingernails 16 up and down against the rough substantially non-abrasive surfaces 14 for a period of time and then stop to feel and enjoy the benefits. With the fingernail stimulator 10 of the second embodiment, the user should briskly and lightly rub the flat part of the fingernails 16 over the rough substantially non-abrasive surface 14. In the method of the invention using the fingernail stimulator 10 of the third embodiment, the user need only place the flat surface of the fingernails 16 on the rough substantially nonabrasive surface 14. The oscillating movement of the plate 12 provides the necessary movement against the fingernails 16. The fingernails 16 should preferably be stimulated in this manner about five minutes, three times a day. A tingling of the fingertips will be felt for approximately one minute directly after use of the fingernail stimulator.

From the foregoing it is to be appreciated that use of the fingernail stimulator 10 of the present invention stimulates the fingernails and fingertips as a result of the buffing. Further, the surface 19 provides a consistent surface for buffing and for efficient buffing by providing the ridges in a close arrangement. Thus, during any buffing cycle, e.g. one up and down buffing cycle of the hands (or one cycle of the driver 22), more impacts are provided to the fingernails and the impacts are more consistent.

Although a particular embodiment of the invention has been described in detail for purposes of illustration, various modifications may be made without departing from the spirit and scope of the invention. Accordingly, the invention is not to be limited, except as by the appended claims.

I claim:

1. A device for stimulating the fingernails and fingertip as a result of buffing comprising:

at least one rigid plate including a buffing surface on both sides of the plate for opposed fingernail buffing and a stand to support the plate in an upstanding position to be oppositively supported between the hands; and said buffing surfaces defined by a rough substantially non-abrasive surface of raised bumps spaced apart less than or equal to one-half inch.

2. The device of claim 1 including said stand including two intergrally formed parallel panels defining said plate.

3. A method for providing stimulation to the fingernails and fingertips of a person comprising:

providing a stand to support rigid plate in an upstanding position, said plate having on opposed sides each including a rough substantially non-abrasive surface defined by raised bumps spaced apart $\leq$ one half inch;

supporting the plate in a position for buffing of the fingernails over the surfaces;

placing the fingernails of the hands against the surfaces in an opposed relationship; and buffing the fingernails against the surfaces for a period of time to provide stimulation thereto.

* * * * *